United States Patent [19]

Oonuma et al.

[11] 4,348,199

[45] Sep. 7, 1982

[54] BUFFER DEVICE FOR A ROLLER CHAIN AND SPROCKET COUPLING

[75] Inventors: Koichiro Oonuma, Shiki; Yoshinori Kawashima, Sakado; Toshinori Hanai, Kamifukuoka, all of Japan

[73] Assignee: Honda Giken Kogyo Kabushiki Kaisha, Tokyo, Japan

[21] Appl. No.: 192,892

[22] Filed: Oct. 1, 1980

[30] Foreign Application Priority Data

Oct. 4, 1979 [JP] Japan .......................... 54-136728[U]

[51] Int. Cl.³ ...................... F16H 9/00; F16H 55/30
[52] U.S. Cl. .................................. 474/156; 305/57; 474/161; 474/151
[58] Field of Search ............... 474/151, 152, 156, 161, 474/177, 178, 901; 305/57; 198/843

[56] References Cited

U.S. PATENT DOCUMENTS 4,034,618  7/1977  Groff et al. ........................ 74/243 R
4,227,422 10/1980  Kawashima et al. ............... 474/156
4,261,214  4/1981  Watanabe et al. .................. 474/156

Primary Examiner—Lawrence J. Staab
Attorney, Agent, or Firm—Lyon & Lyon

[57] ABSTRACT

A buffer device for reducing the impact and noise of the coupling of a roller chain and sprocket. A groove is provided adjacent the teeth of a sprocket which receives a buffer ring. The buffer ring includes an outer resiliently compressible ring and an inner spring-like ring which is not compressible, but which is capable of resilient deformation. The buffer ring is sized to very loosely fit in the groove to avoid wear concentration. The outside diameter of the buffer ring is larger than the inscribed circle of the link plates of the roller chain engaged with the sprocket.

4 Claims, 10 Drawing Figures

BUFFER DEVICE FOR A ROLLER CHAIN AND SPROCKET COUPLING

BACKGROUND OF THE INVENTION

The present invention relates to roller chains and sprockets and specifically relates to a buffer mechanism at the coupling thereof.

Roller chains and sprockets have long been used as a means for transmitting power, timing rotary components and the like. One difficulty associated with such chain and sprocket arrangements is the impact of the chain rollers on the sprocket as they engage. This impact creates excessive noise and excessive wear. This impacting and the noise associated therewith are illustrated in FIG. 1 as resulting from the roller 10 of a chain, schematically illustrated as 12, impacting against the tooth 14 of a sprocket 16 as the chain length 12 bends and oscillates to engage the sprocket 16. The loudest noise is said to occur at the engagement starting point 18 which occurs as indicated by the distribution curve 20 along the travel of the chain.

Because of the noise and wear associated with conventional roller chain and sprocket couplings, devices have been developed in an effort to reduce these problems. These devices have attempted to buffer the chain at this range of points 18. A first such device is illustrated in FIGS. 2 and 3 and includes circular peripheral grooves 22 and 24 on a sprocket 26 on either side of the sprocket teeth 28. Located within the grooves 22 and 24 are resiliently compressible buffer rings 30 and 32. These buffer rings 30 and 32 fit snugly in the grooves 22 and 24 because of their exceptionally resilient nature.

The buffer rings of FIGS. 2 and 3 provide the buffering effect through the resilient restoring force against compression of the rings 30 and 32 in resisting the link plates 34 of the chain 36. This mechanism successfully reduces noise. However, because of the fixed location of the buffer rings 30 and 32 relative to the sprocket 26 and sprocket teeth 28, rapid wear and fatigue is experienced at fixed points on the rings 30 and 32 such that the device becomes relatively impractical.

A second type of buffer ring heretofore known is illustrated in FIGS. 4 and 5. The sprocket 26 again includes circular peripheral grooves 22 and 24 on either side of the sprocket teeth 28 to accommodate metallic buffer rings 38 and 40. The metallic buffer rings 38 and 40 have an inner diameter which is larger than the outer diameter of the bottom of either of the grooves 22 and 24. Also, the buffer rings 38 and 40 have a radial thickness which is less than or equal to the depth of the bottom of the grooves 22 and 24 below the inscribed circle of the link plates of the roller chain where it engages the sprocket. This inscribed circle is identified in FIG. 4 by the numeral 42. The outside diameter of the metallic buffer rings 38 and 40 are also greater than the inscribed circle of the link plates 42.

This latter type of buffer ring, as illustrated in FIGS. 4 and 5, operate solely on deflection, which acts to deform the ring from its circular shape, as illustrated in FIG. 4. The ring material itself is not compressed between the link plates of the chain 36 and the bottom of the grooves 22 and 24 as in the device of FIGS. 2 and 3. An advantage of the metallic buffer rings is that they constantly change position with respect to the teeth 28 of the sprocket 26 and, hence, do not have fixed wear spots. Because of this distortion, the point of application of the effective resilient restoring force provided by the metallic buffer rings 38 and 40 moves to the right, as seen in FIG. 4, away from the point of greatest impact. Consequently, maximum noise abatement cannot be achieved.

SUMMARY OF THE INVENTION

The present invention is directed to a buffer device for a roller chain and sprocket coupling. The present invention is designed to provide maximum buffer effect and at the same time avoid high wear. To this end, a buffer ring is employed which has an outer resiliently compressible ring associated with an inner leaf spring ring. This composite ring is positioned in the chain and sprocket arrangement much like the devices of FIGS. 2 through 4. However, the inside diameter of the buffer ring is larger than the bottom of the groove in which it sits. Yet, the disparity between the inside diameter of the buffer ring and the outside diameter of the bottom of the groove need not be as extreme as with the device of FIG. 4. The present device also employs compression of a portion of the ring as part of the buffering action.

Thus, it is an object of the present invention to provide an improved buffer device for a roller chain and sprocket coupling. Other and further objects and advantages will appear hereinafter.

DETAILED DESCRIPTION OF THE PREFERRED EMBODIMENT

Figure 6:
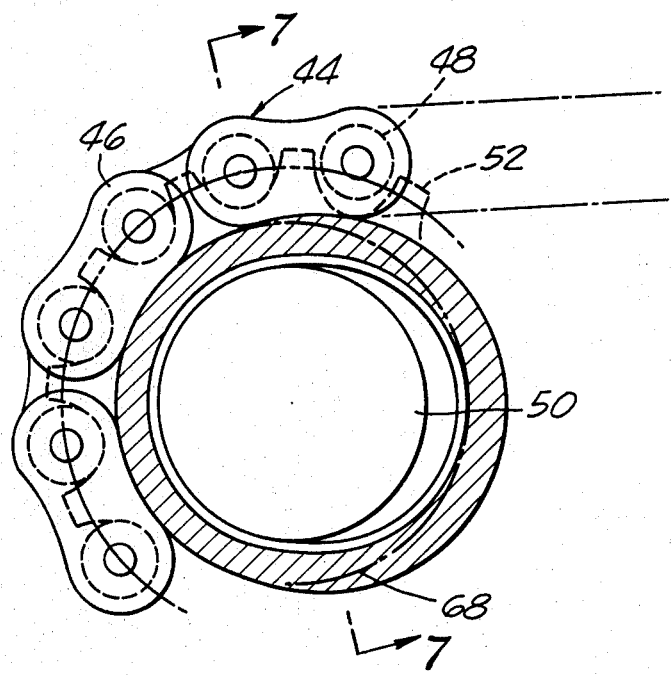
FIG. 6 is a side view of the present invention in association with a roller chain and sprocket coupling.
Figure 7:
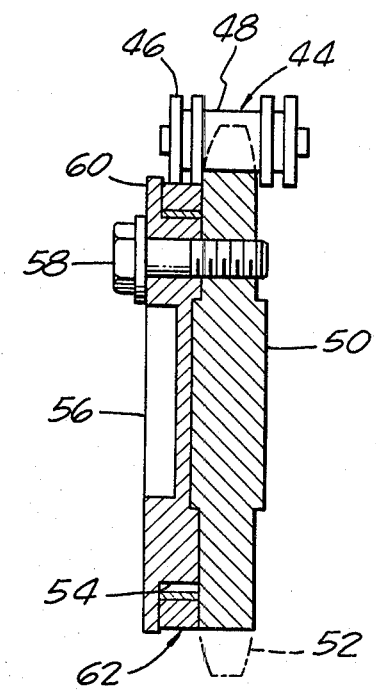
FIG. 7 is a cross-sectional elevation taken along line 7—7 of FIG. 6.

Turning in detail to the drawings, FIGS. 6 and 7 illustrate a roller chain 44 having link plates 46 and rollers 48. The roller chain 44 is associated with a sprocket 50 having teeth 52.

The buffer device includes a circular peripheral groove 54 which is defined by a circular flange member 56. In the preferred embodiment, the circular flange member 56 is positioned on the sprocket 50 by means of fasteners 58. The circular flange member 56 has a radial flange 60 which, in association with the side of the sprocket 50, forms the groove 54. The groove 54 is thereby positioned coaxially with the sprocket 50 and is immediately adjacent the teeth 52 as can be seen in FIG. 7.

Figure 8:
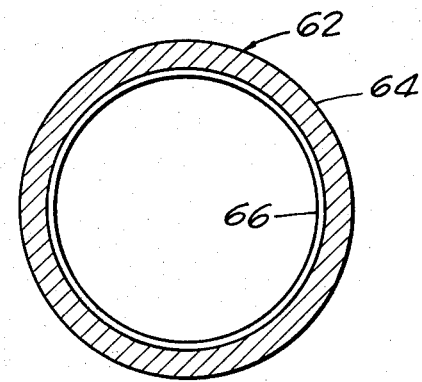
FIG. 8 is a detailed view of a buffer ring of the present invention.
Figure 9:
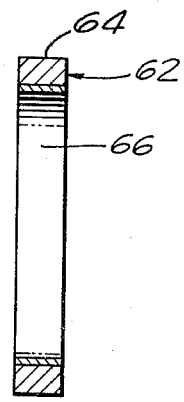
FIG. 9 is a detailed cross-sectional view of a buffer ring of the present invention.

Positioned within the circular peripheral groove 54 is a buffer ring generally designated 62. The buffer ring, as best seen in FIGS. 8 and 9, includes an outer resiliently compressible ring 64 and an inner leaf spring ring 66. These rings are concentrically arranged and are fixed together. The outer ring 64 is selected from a material having a compressibility within the range of rubber, such that it will compress in response to the force of the chain thereon. The inner ring 66 is preferably of spring steel or the equivalent and is not compressible to any significant degree. Instead, the inner ring 66 is resiliently deformable such that it assumes an elliptical shape in the chain and sprocket coupling.

The dimension of the buffer ring 62 is such that the outside diameter of the ring is greater than the inscribed circle 68 of the link plates 46 in the portion of the chain engaged with the sprocket. The overall inside diameter of the buffer ring 62 is sized to be greater than the outside diameter of the bottom of the groove 54. The sum of the outside diameter of the bottom of the groove 54 and twice the radial thickness of the buffer ring 62 is also designed to be greater than the diameter of the inscribed circle 68 of the link plates associated with the sprocket.

In operation, prior to the engagement of the roller 48 with the face of the sprocket tooth 52, the lower edges of the link plates 46 come into pressure contact with the peripheral surface of the buffer ring 62. Since the outside diameter of the buffer ring 62 is greater than the diameter of the inscribed circle of the link plates positioned about the sprocket, and since the inside diameter of the buffer ring 62 is larger than the outside diameter of the bottom of the groove 54, the buffer ring 62 deflects as a whole, as can be seen in FIG. 6. Furthermore, because the sum of the outside diameter of the bottom of the groove 54 and twice the radial thickness of the buffer ring 62 is greater than the diameter of the inscribed circle 68, the outer resilient ring 64 is compressed by the link plates 46. The resilient restoring forces associated with both the outer compressible ring 64 and the inner deformable ring 66 act on the rollers 48 through the link plates 46 to reduce the impact by the rollers on the faces of the sprocket teeth 52.

Figure 1:
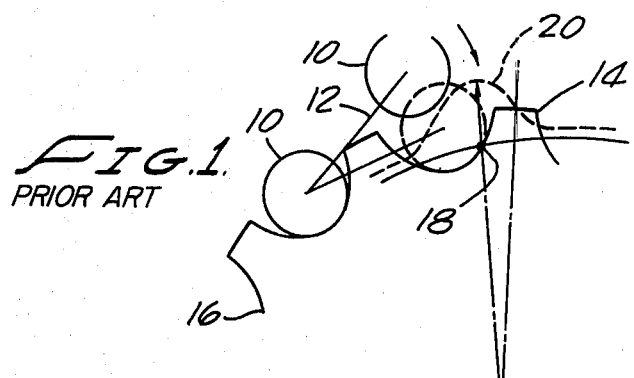
FIG. 1 is a schematic illustration of the coupling between a roller chain and a sprocket.
Figure 2:
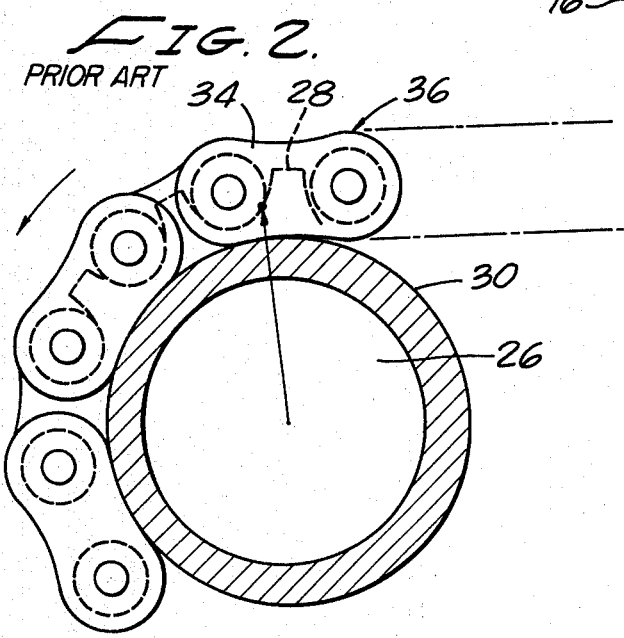
FIG. 2 is a side view of a buffer ring, not of the present invention, as associated with a roller chain and sprocket coupling.
Figure 3:
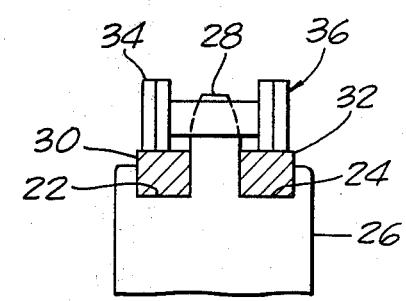
FIG. 3 is a schematic illustration showing a cross-section of the device of FIG. 2.
Figure 4:
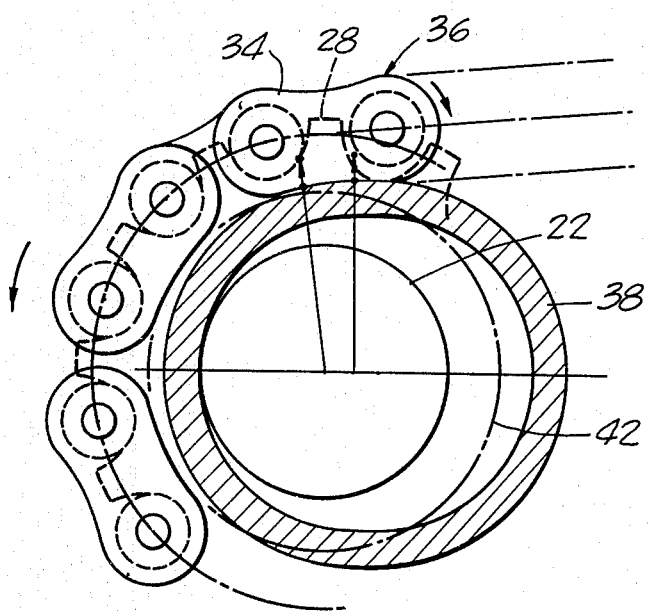
FIG. 4 is a side view of another buffer ring, not of the present invention.
Figure 5:
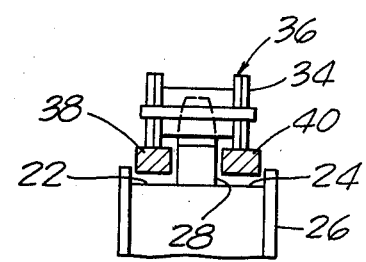
FIG. 5 is a schematic illustration showing the buffer ring mechanism of FIG. 4 in cross-section.
Figure 10:
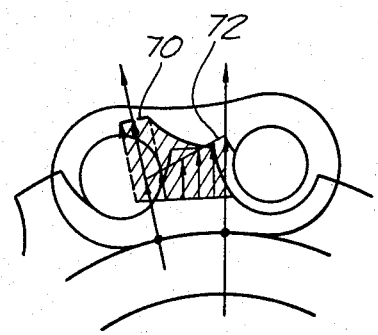
FIG. 10 is a schematic representation showing the distribution of resilient restoring forces at the engagement point of the chain and the sprocket.

FIG. 10 shows the distribution of the resilient restoring force generated in the buffer ring at the engagement point of the rollers 48 on the sprocket teeth 52. The dotted lines, identified as 70, define the buffer force associated with the type of buffer ring illustrated in FIGS. 2 and 3. The solid line, illustrated as 72, indicates the buffer force resulting from the device illustrated in FIGS. 4 and 5. The hatched area illustrates the resulting force provided by the composite buffer ring 62 of the present invention. In realizing this composite buffer force, both the component forces resisting compression of the outer ring 64 and resisting deformation of the inner ring 66 are employed.

Because the buffer ring is larger than the groove in which it sits, the buffer ring will change position relative to the sprocket teeth as the sprocket revolves. Consequently, greater endurance is realized. Finally, the composite structure also does not fail when the resilient portion of the ring has finally worn out. Rather, a gradual increase in noise and coupling impact is experienced.

Thus, an improved buffer device for a roller chain and sprocket coupling is disclosed. It will be apparent to those skilled in the art that many more modifications are possible without departing from the inventive concepts herein described. The invention, therefore, is not to be restricted except by the spirit of the appended claims.

What is claimed is:

1. A buffer device for a roller chain and sprocket coupling comprising a circular, peripheral groove coaxially arranged with the sprocket and adjacent the teeth thereof and a buffer ring positioned in said groove, said buffer ring including an outside resiliently compressible ring and an inside leaf spring concentrically arranged together, the inside diameter of said buffer ring being larger than the outside diameter of the bottom of said groove and the sum of the outside diameter of the bottom of said groove and twice the radial thickness of said buffer ring being greater than the inside diameter of the inscribed circle of the link plates of the portion of the roller chain engaged with the sprocket.

2. The buffer device of claim 1 wherein said resiliently compressible ring has a modulus of elasticity in the range of rubber.

3. The buffer device of claim 1 wherein said leaf spring ring is of spring steel.

4. The buffer device of claim 1 wherein the outside diameter of said buffer ring is greater than the diameter of the inscribed circle of the link plates of the portion of the roller chain engaged with the sprocket.

* * * * *